No. 888,216. PATENTED MAY 19, 1908.
C. A. BAKER.
WHEELBARROW.
APPLICATION FILED SEPT. 6, 1905.
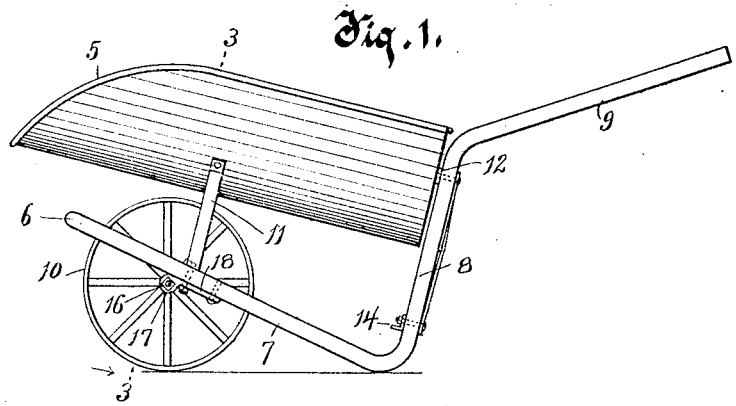
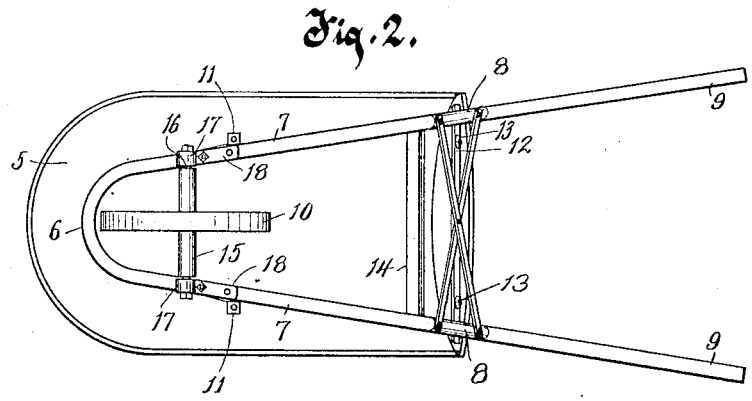
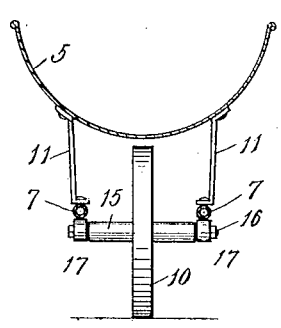
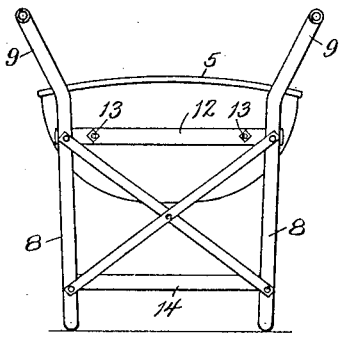
Witnesses:
Inventor.
Charles A. Baker
By Benedick and Morsell
Attorneys.

UNITED STATES PATENT OFFICE.

CHARLES A. BAKER, OF MILWAUKEE, WISCONSIN, ASSIGNOR TO STERLING WHEELBARROW COMPANY, OF MILWAUKEE, WISCONSIN, A CORPORATION OF WISCONSIN.

WHEELBARROW.

No. 888,216.  Specification of Letters Patent.  Patented May 19, 1908.

Application filed September 6, 1905. Serial No. 277,146.

*To all whom it may concern:*

Be it known that I, CHARLES A. BAKER, residing in Milwaukee, in the county of Milwaukee and State of Wisconsin, have invented new and useful Improvements in Wheelbarrows, of which the following is a description, reference being had to the accompanying drawings, which are a part of this specification.

My invention has relation to improvements in wheelbarrows.

The primary object of the invention is to provide a construction wherein the handles, legs, wheel support, and front guard for the wheel are formed in one continuous piece, arranged and constructed especially for supporting the tray or body of the wheelbarrow at a considerable distance above the supporting frame.

With the above primary object, and other incidental objects, in view, the invention consists of the devices and parts, or the equivalents thereof, as hereinafter more fully set forth.

In the accompanying drawing, Figure 1 is a side elevation of my improved wheelbarrow. Fig. 2 is a bottom plan view thereof. Fig. 3 is a cross section on the line 3—3 of Fig. 1; and, Fig. 4 is a rear end view.

Referring to the drawing, the numeral 5 indicates an ordinary form of wheelbarrow scoop tray.

Referring particularly to my improvements, the same consist of a continuous piece, preferably of metal, and bent in the following manner, in order to form the handles, rear legs, the wheel support, and the front guard for the wheel. The continuous piece is bent and curved around at its center, to form a wheel guard 6, and the two parts formed by the bend are extended in divergent lines for a desired distance, to form the two members 7—7 of a wheel support, and are thence curved around and bent upwardly in substantially parallel lines, and at a slight incline to form the legs 8—8, the rounded bends formed at the lower ends of said legs being adapted to rest on the ground, or other support, and from the upper ends of the legs the members are bent at an angle to said legs and rearwardly, preferably at a slight upward incline, and also preferably in divergent lines, to form the handles 9—9.

The continuous piece, bent as described, is fitted to the wheelbarrow tray and to the wheel in the manner clearly shown in the drawing. From the drawing, it will be seen that the wheel 10 of the barrow is disposed between the members 7—7 of the wheel support, with the rounded guard 6 in front of the wheel a sufficient distance to give said wheel the proper clearance.

The wheel supporting members 7 may be connected to the tray of the barrow in any desirable manner. I show for the purpose two straps 11, 11 secured at their upper ends to the under side of the wheelbarrow tray at points distant from each other laterally, and also at points considerably removed rearwardly from the forward end of the wheelbarrow tray. The lower ends of these straps are bent inwardly and riveted to the upper sides of the members 7. The said straps are also sufficiently long to support the tray at a considerable height above the frame. The leg members 8 are connected near their upper ends by means of a transverse flat brace bar 12, and bolts 13 are passed through the rear end of the tray and through this strap. The said strap, therefore, not only serves as a brace for the upper ends of the legs, but also, in conjunction with the bolts 13, acts as a means for supporting the rear end of the tray. The tray is so supported by the attaching and supporting means that it will be on a slight decline from the front end thereof rearwardly, when the rounded lower ends of the legs 8 are resting upon the ground, or other support. The members 7, therefore, are necessarily on a down slant from their front ends rearwardly to where they join the rounded lower ends of the legs, which, of course, has the effect of bringing the tray, when the rounded lower ends of the legs are resting on the ground, at the proper and required distance above the ground.

In addition to the upper brace bar 12, I prefer to brace the lower ends of the legs 8 by means of another brace bar 14, advisably in the form of an angle iron. By the provision of the two brace bars 12 and 14, it will be evident that great rigidity and strength are secured.

The wheel 10 may be carried between the members 7 in any desirable manner. In the drawing, I have shown a wheel hub 15 revoluble on an axle 16, said axle having its ends mounted in journal boxes 17, 17 carried at the forward ends of arms 18, 18 secured to the under sides of the members 7.

As previously stated, the one piece wheel guard, wheel support, legs, and handle are preferably made of metal. I also prefer to make this one piece construction from a single continuous tube. I do not, however, limit myself to the tube form, as I would consider a one piece construction of non-tubular form as within the spirit and scope of my invention.

As heretofore suggested, the particular form of wheel guard, wheel support, legs, and handles herein shown and described is intended for use in connection with a tray which is to be supported at a distance above the supporting frame, the scooped form of tray being preferably employed. Therefore, said wheel guard, support, legs and handles, as well as the tray supporting medium, are all constructed and arranged so as to adapt them to support the tray at a desired height.

What I claim as my invention is:

1. In a wheelbarrow, the combination with a tray, of handles, legs, a wheel support, and a wheel guard, said handles, legs, wheel support and wheel guard being formed from a single continuous piece bent and curved around at its center to form a wheel guard and continued rearwardly for a desired distance in two downwardly slanting members, said members being bent upwardly from the rear terminals thereof to form legs, and finally bent rearwardly at angles to the legs to form the handles, the bends at the lower junction of the legs with the rear ends of the inclined members constituting the parts which contact with the ground when the wheelbarrow is at rest, a wheel disposed between the inclined wheel supporting members and having its axle journaled in bearings on said wheel supporting members, and a tray supporting means extending upwardly from the wheel supporting members and engaging and secured to the wheelbarrow tray, said tray supporting means being of such height as to support the tray at a distance above the frame.

2. In a wheelbarrow, the combination with a tray of scoop form, of handles, legs, a wheel support, and a wheel guard, said handles, legs, wheel support, and wheel guard being formed from a single continuous piece bent and curved around at its center to form a wheel guard and continued rearwardly for a desired distance in two downwardly slanting members, said members being bent upwardly from the rear terminals thereof to form legs, and finally bent rearwardly at angles to the legs to form the handles, the bends at the lower junction of the legs with the rear ends of the inclined members constituting the parts which contact with the ground when the wheelbarrow is at rest, a wheel disposed between the inclined wheel supporting members, and having its axle journaled in bearings on said wheel supporting members, and tray supporting means extending upwardly from the wheel supporting members and engaging and secured to the wheelbarrow tray, said tray supporting means being of such height as to support the tray at a distance above the frame.

In testimony whereof, I affix my signature, in presence of two witnesses.

CHARLES A. BAKER.

Witnesses:
A. L. MORSELL,
ANNA F. SCHMIDTBAUER.